United States Patent [19]

Muller

[11] 4,116,909

[45] Sep. 26, 1978

[54] PARTICLE AND METHOD FOR DISPERSING ADDITIVES IN THERMOPLASTIC RESIN

[75] Inventor: Bruce M. Muller, Homerville, Ohio

[73] Assignee: Customcolor, Inc., Cumberland, R.I.

[21] Appl. No.: 709,392

[22] Filed: Jul. 28, 1976

[51] Int. Cl.$^2$ .............................................. C08K 9/00
[52] U.S. Cl. .......................... 260/23.7 R; 260/27 BB; 260/33.6 A; 260/42.56; 260/42.57; 260/42.47; 106/308 M
[58] Field of Search ........... 260/42.47, 27 BB, 23.7 R, 260/42.56, 42.57, 33.6 A; 106/308 M

[56] References Cited

U.S. PATENT DOCUMENTS

| | | | |
|---|---|---|---|
| 3,271,354 | 9/1966 | Weissert et al. | 260/42.56 |
| 3,434,991 | 3/1969 | Aron | 260/33.6 AQ |
| 3,455,871 | 7/1969 | Coover, Jr. et al. | 260/42.56 |
| 3,527,844 | 9/1970 | Hull et al. | 260/42.56 |
| 3,629,186 | 12/1971 | Hull et al. | 260/42.56 |
| 3,694,402 | 9/1972 | Essam | 260/42.56 |
| 3,726,944 | 4/1973 | Bennett et al. | 260/42.47 |
| 3,846,360 | 11/1974 | Needham | 260/889 |
| 3,925,271 | 12/1975 | Balinth | 260/23.7 R |
| 3,950,288 | 4/1976 | Herbst et al. | 106/308 M |
| 3,954,692 | 5/1976 | Downey | 260/888 |
| 3,987,002 | 10/1976 | Lakshmanan | 260/42.47 |
| 4,001,035 | 1/1977 | Ito et al. | 260/42.57 |
| 4,020,040 | 4/1977 | Kattoh et al. | 260/42.56 |

OTHER PUBLICATIONS

"Materials and Compounding Ingredients For Rubber", 1968, pp. 76 & 165, Rubber World, N.Y.

Primary Examiner—Eugene C. Rzucidlo
Attorney, Agent, or Firm—Norman S. Blodgett; Gerry A. Blodgett

[57] ABSTRACT

A particle and method for dispersing additives in a thermoplastic resin. The particle consists of a high concentration of additive material, a thermoplastic rubber, a resin, and modifiers. The method involves forming the particle with a high concentration of additive and adding the particle to a mass of thermoplastic resin.

14 Claims, 1 Drawing Figure

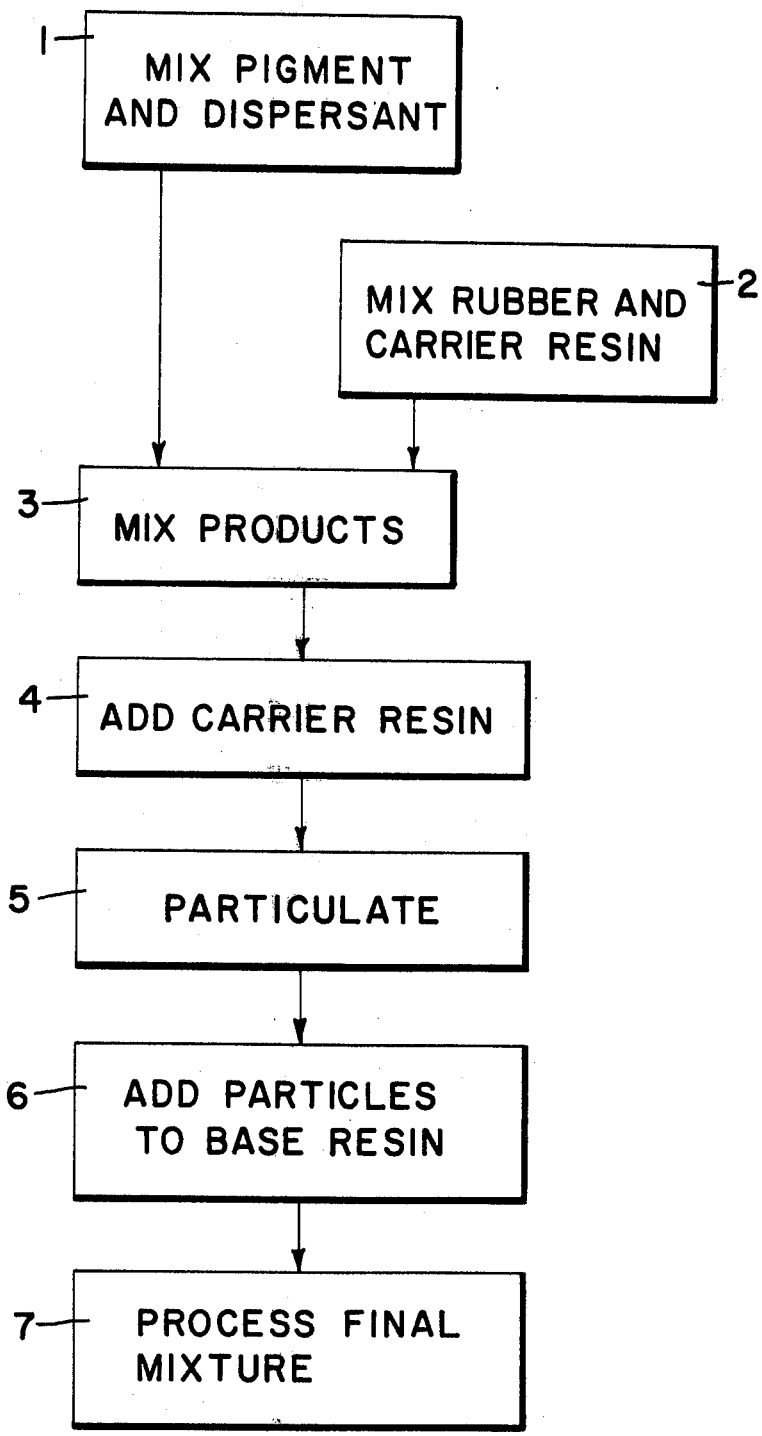

PARTICLE AND METHOD FOR DISPERSING ADDITIVES IN THERMOPLASTIC RESIN

BACKGROUND OF THE INVENTION

The art of compounding various additives into masses of thermoplastic resin in order to modify the properties of products manufactured from the resin is a major aspect of plastics technology. Although each segment of the plastics additives industry has its unique problems, the addition of pigment to color plastics is probably the most important and the most difficult.

The problems in color compounding begin with the fact that, while there is an unlimited number of color variations which can be created in plastics, precise color matching is often necessary. Small variations in color within an individual plastic part or among the parts of a plastic product can easily be detected even by an untrained eye and are not acceptable, particularly in consumer products. The color which will be rendered by a given combination of pigments can vary a great deal depending on the nature of the base resin, variations in the pigments themselves, and the quality of the dispersion of the pigments in the base resin. The fact that most pigments do not easily disperse in masses of resin and that improper dispersion of the pigment can cause deterioration of the properties of the plastic such as specking or streaking and can add to the difficulties of coloring.

Various approaches have been developed to solve the problem of color matching and consistency. In one approach, the plastics processor or molder mixes the natural polymer (which he has purchased from a resin manufacturer) with suitable quantities of powdered pigments and provides his own quality control. Because of the high state of technology relating to the matching and mixing of the pigments to achieve proper color and dispersion with the plastic mass, and because of the health and the aesthetic problems resulting from the airborne dust generated by dry pigments, this approach is not practical for the great majority of molders, Furthermore, contamination and housekeeping is a definite problem where colored dust is present.

In a second approach, the resin manufacturer provides the resin to the molder in a mixed and precolored final form. In general, the extremely large firms which are in the business of manufacturing the natural resin, find it impractical to supply the specific color and additive combinations desired by the molders, except for a few very common formulations.

The result is a third approach, the development of the custom compounding industry whose function is to modify the standard compounds manufactured by the resin producers into products which are suited to the specific needs of individual molders. This approach has the problem that it still requires the manufacture of large quantities of specially-formulated plastic which has to be stored in sufficient quantities to avoid shortages and, therefore, is subject to destruction and obsolescence. The precolored or compounding approach is also substantially more costly because it involves another step in preparing usable plastic resin, entirely by-passed when adding a concentrate. The compounding step also adds to the heat history of a plastic resin, thus reducing its ability to withstand degradation during processing in the final step of fabricating a useful part. The storage of quantities of various colors of compounded plastic resin also consumes considerable space and ties up costly capital unnecessarily.

Most recently the custom compounding industry has offered to the molder an additive concentrate which the molder can mix into this natural resin using simple and inexpensive techniques. The additive concentrates are specifically formulated, so that, when they are mixed in proper proportion into the natural resin, the final mixture has the specific properties desired by the molder. The concentrates are provided in a form which is easy to handle, easy to disperse in the base resin, and does not have the dusting and other undesirable properties of normal additives.

Several types of additive concentrates are in use. In one form, the additive is dispersed in a carrier of the same plastic to which the concentrate is to be added or one of easier flow or a compatible plastic. In this way, compatibility problems between the carrier and the natural resin are avoided. However, because most plastics will only accept a relatively low concentration of additive before they are capable of absorbing no more, a large volume of the concentrate of relatively low additive concentration must be used in the final mixture. Also, a given concentrate with its specific carrier resin is normally only compatible in a single type of base resin, thus, limiting the usefulness of a given concentrate formulation.

Another type of concentrate called "liquid color," involves a suspension of additive in a liquid carrier. While a fairly high concentration of additive can be provided, additive distribution in the final product is not always satisfactory and, because the vehicle is often not compatible with the base resin, the physical properties of the base resin may sometimes be adversely effected. The liquid vehicle often causes the color to streak and for this reason does not perform quite as well as concentrate. A further type of concentrate involves dispersions of the additive in a wax base. While very high concentrations can be achieved, the wax base very often adversely effects the properties of the plastic mixture and the processing conditions. These and other difficulties experienced with the prior art systems have been obviated in a novel manner by the present invention.

It is, therefore, an outstanding object of the invention to provide an additive concentrate particle which can be added to a mass of thermoplastic resin in a simple manner.

Another object of this invention is the provision of an additive concentrate particle which will provide a uniform and consistent distribution of the additive within the let-down or dilution resin.

A further object of the present invention is the provision of an additive concentrate particle which is completely non-dusting in transportation and use.

It is another object of the instant invention to provide an additive concentrate particle which is capable of carrying an extremely high concentration of the additive, so that the amount of concentrate which must be added to the dilution resin is minimized.

A still further object of the invention is the provision of an additive concentrate particle which has good physical properties, can, therefore, be handled and used with simple and convenient techniques, and can be used with existing dispensers.

It is a further object of the invention to provide an additive concentrate particle having a carrier which improves many physical properties of the final resin mix.

It is a still further object of the present invention to provide an additive concentrate particle which is compatible with a wide range of dilution resins.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

This invention involves an additive concentrate particle system for dispersing an additive in a mass of thermoplastic resin. The particle includes a carrier and an extremely high concentration of additive mixed into the carrier. The carrier is a mixture of a thermoplastic rubber, a resin, and various modifiers.

BRIEF DESCRIPTION OF THE DRAWING

The character of the invention, however, may be best understood by reference to one of its forms, as illustrated by the accompanying drawing, in which:

The FIGURE is a flow chart showing the steps of a system embodying the principles of the present invention.

DESCRIPTION OF THE PREFERRED EMBODIMENT

EXAMPLE 1

|  | Wt. % |
|---|---|
| Pigment (Titanium Dioxide) | 80.0 |
| Thermoplastic Rubber (stabilized) | 10.9 |
| Hydrocarbon Resin | 1.1 |
| Dispersant (Zinc Stearate) | 8.0 |

Example 1 results in a particle useful for dispersing white pigment into a base resin. The process for formulating the concentrate particles is generally shown in FIG. 1. In Step 1, the dispersant is uniformly mixed with the dry, powder pigment. Step 2 is a separate mixing operation in which the thermoplastic rubber is mixed with approximately half of the carrier resin. In Step 3 the products of Step 1 and Step 2 are heated to plasticity and mixed together in a heated two-roll mill to develop a uniform mass. In Step 4 the remainder of the carrier resin is added and the mass is mixed to uniformity.

In Step 5, the mass of ingredients is particulated into a form which is compatible with the proportioning and particle mixing equipment of the molder or other final manufacturer. In this case, the product of Step 4 is cooled to room temperature at which temperature it is a somewhat flexible solid and the product is then put through a granulator which forms the mass into small (approximately 4 millimeter) particles of irregular, "popcorn-like" shape. Also product of Step 4 may be diced to a uniform and consistent ⅛ × ⅛ inch cube or slight size variation to more closely duplicate the natural polymer size and shape. Each method may have desirable properties for different methods of mixing by the end processor. In such form, the particles are easy to handle and adaptable to long storage time without deterioration. The particles are shipped to the final manufacturer in this form.

In Step 6, the final manufacturer incorporates the particles of a specific concentrate in his base resin in a predetermined proportion to provide the precise color he desires. The proportioning equipment can be of the conventional type used for adding prior art concentrate particles or the particles and base resin can be mixed batch-wise in a standard dry-mixing system. In Step 7, the final mixture of particles in base resin is processed in the conventional way to form finished products of plastic into which the additive has been uniformly dispersed. It is found that the dispersion of the additive is extremely uniform even in a short length of the conventional screw extruder without changing the temperature or the processing condition from the normal melting temperature used in the normal processing operation. Furthermore, it is found that the finished product manufactured from plastic into which the concentrate particles of the present invention have been added possess impact strength superior to products not so treated. This is found to be particularly important when the final product must be heavily loaded with non-polymeric additives.

EXAMPLE 2

|  | Wt. % |
|---|---|
| Pigment (Iron Oxide) | 41.8 |
| (Lamp Black) | 3.4 |
| (Titanium Dioxide) | 9.9 |
| Thermoplastic Rubber (stabilized) | 21.6 |
| Carrier Resin | 2.2 |
| Dispersant (Zinc Stearate) | 10.0 |
| Stiffener and Grinding Agent | |
| (Calcium Carbonate) | 10.0 |

The preparation of a brown pigment of the above formula was accomplished using the general procedure described in Example 1, except that it was found beneficial to add a stiffener to increase the room temperature viscosity of the particles and, by embrittling the particles, promotes easier granulation, while also reducing product cost. This stiffener is added in Step 1.

EXAMPLE 3

|  | Wt. % |
|---|---|
| Pigment (Red Lake C) | 50 |
| Thermoplastic Rubber (stabilized) | 17.2 |
| Carrier Resin and tackifier | 3.8 |
| Disperant (Zinc Stearate) | 10.2 |
| Stiffener (Calcium Carbonate) | 16.2 |
| Dryer (Silica Gel) | 1.0 |
| Plasticizer and wetting agent | 1.8 |

Concentrate particles of this formula were prepared using the general process described in Example 1. However, the addition of a stiffener, a dryer and a plasticizer were found to improve the handling and processing characteristics of the particles which resulted from Step 5 and to improve the dispersion of the particular pigment during Step 7. The plasticizer makes for easier milling in Step 3 and also aids in "wetting" the pigment. The stiffener, plasticizer, and about half of the dryer were added in Step 1 and the remainder of the dryer was added following Step 5. This was particularly important to remove some of the tackiness of the particles in this particular formulation caused by both the hydrocarbon resin and the plasticizer.

Referring now to Table I, it can be seen that particles formulated in accordance with this disclosure are superior in many respects to other available additive delivery systems. The cost of using the present particles is lower or equal to various alternatives, not only because the materials which form the particle are relatively inexpensive, but also, because the high concentration and excellent handling characteristics reduce the cost of transportation, storage, and final dispersion. The present particles are substantially non-dusting, a factor which is important, not only from a safety point of view, but also from the point of view of plant housekeeping. The pigment dispersion and distribution in the final product is excellent, a factor which is particularly critical in coloring, since non-uniform pigment dispersion and distribution will result in non-uniform colors, specifically specking and streaking.

TABLE 1

A COMPARISON OF AVAILABLE COLORING SYSTEMS

|  | Dry Color | Color Concentrate | Liquid Color | Wax Base Dispersion | Particles of This Disclosure |
|---|---|---|---|---|---|
| Cost | Low | High | Moderate | Mod. High | Low |
| Non Dusting | Poor | Excellent | Excellent | Good | Excellent |
| Pigment Dispersion | Good | Excellent | Excellent | Excellent | Excellent |
| Pigment Distribution | Excellent | Good | Fair | Good | Excellent |
| Ratio Needed | 0.5%–1.5% | 2%–5% | 1.0% | 1%–2% | 0.5%–2.0% |
| Vehicle Compatibility | Excellent | Good | Fair | Good | Excellent |
| Effect on Physicals | Minor | Adverse | Adverse | Adverse | Beneficial |
| Dispensability | Poor | Good | Excellent | Good | Good |
| Multi-resin Applicability | Yes | No | Yes | Yes | Yes |

The weight ratio of the present particles which must be added to a given mass of base resin is significantly lower than other methods. This reduces cost and other problems associated with storage and proportioning of additive concentrates. It is found that the addition of the present particles actually improves some of the physical properties of the final products. Particularly, an increase in the impact strength in polystyrene, polypropylene, acrylic resins, and ABS have been noted.

Another important advantage of the particles produced by the present invention is that the superior handling characteristics of the particles allow simple and inexpensive proportioning devices to dispense the concentrate into the base resin. Proper proportioning is not critical in coloring, but is also important in the most economic addition of other types of additives. Finally, the present particles are found to be compatible with almost all base resins which are commercially used, especially the styrenics. This fact reduces the cost and complexity of additive processing where a final manufacturer uses more than one type of polymer in this plant.

A major component in concentrate particles of the present invention is the additive itself. While the present invention is particularly advantageous when the additive concerned is a color pigment, the invention is also extremely useful in the economical addition of additives such as anti-oxidants, anti-static agents, fiberous reinforcements, fillers, flame retardants, heat stabilizers, lubricants, organic peroxides, plasticizers, preservatives, processing aids, coupling agents, foaming agents and ultra-violet stabilizers. The additive may be present as 50 to 95 percent of the final particle with the preferred range being 70 to 90 percent and the optimum being approximately 80 percent. It is found desirable, where less than 80 percent pigment is used, to add a stiffener such as calcium carbonate to the mixture to bring the total of pigment and filler up to 80 percent.

Another critical element of the present invention is the presence of a thermoplastic rubber of the styrene-olefin-styrene block copolymer-type, preferably styrene-butidiene-styrene block copolymer sold under the trade name "Kraton" by Shell Chemical Co., and even more specifically "Kraton 4122." The thermoplastic rubber is present in the concentrate particles to the extend of 3 to 25 wt.% of the particle and preferably 10 to 25 percent. The thermoplastic rubber is a pseudoplastic, two-phase material and these properties contribute not only to the ability of the material to bind large quantities of powders, but also contributes to the rapid dispersion of powders when the powder-rubber mixture is subject to bulk shear forces within a body of Newtonian fluid such as the majority of thermoplastic resins in a molten state.

The carrier resin used in Examples 1, 2, and 3 is a petroleum-based, alkalated aromatic hydrocarbon resin having an average molecular weight of approximately 770 and a ring-and-ball softening point of approximately 100° C. In the preferred embodiment, the carrier resin was that sold under the trade name "Nevchem 100" hydrocarbon resin by Neville Chemical Company. The carrier resin is necessary for two reasons. First, it imparts smooth fluid flow characteristics to the heavily additive loaded thermoplastic rubber. Second, the carrier or hydrocarbon resin acts as a tackifier, causing the mixture processed in Step 3 to adhere to the rolls of a two-roll mill, so that sufficient internal shear is developed and uniform mixing can be accomplished. It also aids in wetting the pigment. The carrier resin is normally present to the extent of 5 to 20 parts by weight per 100 parts of rubber, and preferably, 8 to 12 parts by weight per 100 parts of rubber. In the preferred embodiment, the resin is present as approximately 10 parts per 100 parts of rubber.

The remainder of the elements of the present invention are provided to improve the performance of the particle in formation and use, and while important, are not absolutely essential to the function of the invention. The dispersant in the preferred embodiment is zinc stearate which is present to the extent of approximately 10 wt.% in the final particle. The preferred stiffener is finely divided calcium carbonate and is normally present to the extent that the sum of the additive and stiffener equals approximately 80 wt. % of the final particle. Finely divided silica gel is the preferred dryer and is present from 0 to approximately 1 wt. % of the final pellet to reduce tackiness of the final particle. The plasticizer is an epoxidized oil and more specifically, a monomeric epoxidized soy bean oil sold under the trade name "Admix 710" by Ashland Chemical Company. It is present when necessary to soften the final particles to the extent of about 2 wt.% of the final particle.

While it will be apparent that the illustrated embodiments of the invention herein disclosed are calculated adequately to fulfill the objects and advantages primarily stated, it is understood that the invention is susceptible to variation, modification, and change within the spirit and scope of the subjoined claims.

The invention having been thus described, what is claimed as new and desired to secure by Letters Patent is:

1. An additive particle adapted to be added to a mass of thermoplastic base resin to impact property improvement to the mass, comprising a mixture of:
   (a) an additive which includes pigment said pigment being from about 50 to 95 weight percent of said particle,
   (b) from about 3 to about 25 weight percent of said particle of thermoplastic rubber which is a styrene-olefin-styrene block copolymer, and
   (c) about 5 to about 20 parts by weight per 100 parts thermoplastic rubber of petroleum-based, alkylated aromatic hydrocarbon carrier resin having an average molecular weight of approximately 770 and a ring-and-ball softening point of approximately 100° C.

2. A particle as recited in claim 1, wherein the thermoplastic rubber is styrene-butadiene-styrene block copolymer.

3. A particle as recited in claim 1, wherein said additive contains approximately 10 wt. % of zinc stearate.

4. A particle as recited in claim 1, wherein the particle includes 2 wt.% of a monomeric epoxydized soy bean oil.

5. A particle as recited in claim 1, wherein the particle contains calcium carbonate.

6. A particle as recited in claim 1, wherein the particle contains silica gel.

7. A method of forming pigment particles for incorporation to a mass of thermoplastic base resin comprising the steps of:
   (a) mixing dry, powder pigment and dispersant,
   (b) mixing thermoplastic rubber which is styrene-olefin-styrene block copolymer with about 2.5 to 10 parts by weight per 100 parts by weight of said thermoplastic rubber of petroleum-based, alkylated aromatic hydrocarbon carrier resin having an average molecuolar weight of approximately 770 and a ring-and-ball softening point of approximately 100° C.,
   (c) heating the products of steps (a) and (b) to plasticity,
   (d) mixing the plasticized products of steps (a) and (b) together into a uniform mass in the ratio of 3 to 25 parts by weight of thermoplastic rubber to 50 to 95 parts by weight of pigment,
   (e) adding to said plasticized uniform mass an additional 2.5 to 10 parts by weight of said carrier resin,
   (f) uniformly mixing the products of steps (c) and (e) together,
   (g) cooling the mixture of steps (f) to room temperature until solid, and
   (h) granulating the product of step (g).

8. A method as recited in claim 7, wherein said thermoplastic rubber is a styrene-butadiene-styrene block copolymer.

9. A method as recited in claim 7, wherein the dispersant is zinc stearate.

10. A method as recited in claim 7, wherein prior to step (d), the product of step (a) is mixed with a monomeric epoxydized soy bean oil.

11. A method as recited in claim 7, wherein prior to step (d), a drying agent is added to the product of step (a).

12. A method as recited in claim 11, wherein the drying agent is finely divided silica gel.

13. A method as recited in claim 7, wherein a drying agent is added to the mixture resulting from step (e).

14. A method as recited in claim 13, wherein the drying agent is finely divided silica gel.

* * * * *